United States Patent [19]

Lapidus et al.

[11] 3,986,590

[45] Oct. 19, 1975

[54] CONTAINER DELIVERY APPARATUS

[76] Inventors: Berton M. Lapidus, 145 W. 86th St., New York, N.Y. 10024; Gerard F. Dehner, 300 South St., Vernon, Conn. 06066

[22] Filed: May 6, 1975

[21] Appl. No.: 575,068

[52] U.S. Cl. .................................. 193/32; 243/1; 243/19; 243/30; 243/31; 243/32
[51] Int. Cl.² ...................... B65G 11/20; B65G 51/04
[58] Field of Search .................. 243/1, 2, 19, 5, 29, 243/30, 31, 36, 38, 16 R, 16 M, 20, 23, 24, 28, 25, 10, 11, 12; 193/31 R, 31 A, 32, 29, 2; 302/2 R

[56] References Cited
UNITED STATES PATENTS

| | | | |
|---|---|---|---|
| 370,044 | 9/1887 | Bryson et al. | 243/30 |
| 524,006 | 8/1894 | Underwood | 243/30 |
| 583,246 | 5/1897 | Bostedo | 243/30 |
| 1,112,304 | 9/1914 | Loebenberg | 243/19 |
| 1,626,214 | 4/1927 | Stoetzel | 243/12 X |
| 1,819,307 | 8/1931 | Stoetzel | 243/23 X |
| 1,883,844 | 10/1932 | Needham | 243/31 X |
| 1,923,052 | 8/1933 | Chulstrom | 243/31 X |
| 2,128,671 | 8/1938 | Drenkard | 243/16 R |
| 3,893,557 | 7/1975 | Frenk | 243/23 X |

Primary Examiner—Johnny D. Cherry
Assistant Examiner—James L. Rowland
Attorney, Agent, or Firm—Amster & Rothstein

[57] ABSTRACT

Apparatus is provided for use in delivering a container within a conduit from a first, raised location, to a second lower location with the conduit remaining substantially at atmospheric pressure. The container includes a descent-regulating member having an exterior configuration which closely approximates the interior configuration of the conduit thereby providing a braking effect on the container as it traverses the conduit from the upper to the lower location and causing the container to descend within the conduit at a substantially constant, controlled rate. The apparatus includes provision for inserting containers within the conduit at the first location and removing containers from the conduit at the second location without substantially changing the amount of fluid within the conduit between the first and second locations. In a preferred embodiment, the conduit is closed at the ends proximate both the first and second locations. Alternately, the conduit may be closed only at the top end or only at the bottom end. The rate of descent of the container within the conduit is such that fragile contents can be transported therein without special support or cushioning.

7 Claims, 7 Drawing Figures

FIG. 2

CONTAINER DELIVERY APPARATUS

The present invention relates generally to container delivery apparatus and, in particular, to apparatus for use in delivering a container from an upper to a lower location at a controlled rate of descent.

Numerous systems and methods have been available for transportation of containers between two disparate locations. In general, such systems have included apparatus for mechanically conveying containers adapted for receipt of various items, or the items themselves, from one location to another. Such devices have included mechanically moving belts having shelves thereon, larger containers affixed to conveying apparatus within a closed circuit or loop such as the well-known "dumb waiter" system utilized in numerous locations and other like, mechanical transport devices.

In addition, for many years, systems have been available for transportation of containers and material between two locations which systems have utilized conduits that are in communication with a source of a motive force such as pressurized fluid. An example of the latter, is the well-known pneumatic delivery systems utilized by various business establishments for transporting invoices and currency between remote sales locations and central cashier locations.

Common to virtually all of the container or article transport systems heretofore in use has either been the necessity for complicated, expensive, mechanical transportation means or the necessity for complicated, expensive fluid-pressure-alteration equipment. An example of the latter is equipment which must provide air at pressure above or below atmospheric pressure. In addition, such pressure systems must include provision for ensuring maintenance of the pressure-integrity of the conduits with which the fluid-pressure-alteration equipment communicates.

In addition to both the initial and maintenance expense associated with such high or low pressure-related conduit transportation systems, there has existed the additional problem of maintaining the conduits themselves and the entry and exit ports in communication therewith in sufficiently pressure-integral condition to prevent either the unwanted exiting from a conduit of pressurized article-transporting fluid; or, to prevent the entrance into a vacuum-containing conduit of unwanted external air from without the closed system.

In view of the normal high speed transportation of containers and/or items from one location to another afforded by high or low pressure-related systems previously available, special provision has had to have been made for halting the rapid progress of the containers or items transported once the point of exit from the system was reached.

Further, the containers for transportation of contents between the first and second locations (and the items themselves if they were to be transported from the first to the second location without external containers) had to be designed to protect the contents thereof from the jarring which would necessarily result from transportation through a conduit at a relatively high rate of speed coupled with rapid deceleration upon reaching the point of termination. Alternately, these systems were not usable for transportation of fragile materials.

It is the object of the present invention to provide an improved method of transportation of items from a first location to a second location which is lowered with respect thereto, through the use of a relatively simple and inexpensive apparatus.

It is a more particular object of the present invention to provide apparatus usable in the method of transporting an item from a first location to a second location at a controlled rate of speed substantially only under the impelling action of the force of gravity without requiring external impelling apparatus.

It is a still more particular object of the present invention to provide an apparatus usable in the method of transporting an item from a first location to a second location through a conduit including means for controlling placement into and removal of said container or item from said conduit without substantially changing the amount of fluid within said conduit.

In accordance with an illustrative embodiment demonstrating objects and features of the present invention, there is provided apparatus usable for transporting at least one container between a first location and a second location, the first location being elevated relative to the second location. The apparatus includes a conduit which has at least a first end and a second end. The conduit includes means which are adapted to substantially completely prevent movement of fluid relative to the interior of the conduit through at least one of the conduit ends. The conduit extends between the first location and the second location and has an interior with a given configuration. The container includes fluid passage restrictive means. The fluid passage restriction means of the container has an external configuration which is constructed and arranged relative to the interior configuration of the conduit to be usable in controlling movement of the container within the conduit from the first location to the second location by restricting the passage of fluid between the conduit interior and the external configuration of the fluid passage restriction means. Conduit exchange means are provided in communication with the conduit proximate one of the locations. The conduit exchange means is constructed and arranged to permit movement of a container between the interior and exterior of the conduit at said location so that the amount of fluid within the conduit at said location remains substantially unchanged through the exchange means.

The above brief description as well as further objects, features and advantages of the present invention will be more fully understood by reference to the following detailed description of the presently preferred but nonetheless illustrative embodiment in accordance with the present invention, when taken in conjunction with the accompanying drawing, wherein:

FIG. 3 is a sectional perspective view, on a reduced scale, of the conduit exchange member of FIG. 2, with parts broken away;

FIG. 4 is a schematic elevational view of apparatus for preventing interference of a container within the conduit with a container entering the conduit;

FIG. 5A is a schematic elevational view of an apparatus for preventing operation of the conduit exchange member upon a container being proximate said conduit exchange member with a container shown proximate said apparatus; and, FIG. 5B is a view similar to FIG. 5A with a container shown approaching but not proximate said container exchange member.

Figures 1, 1A, 2:
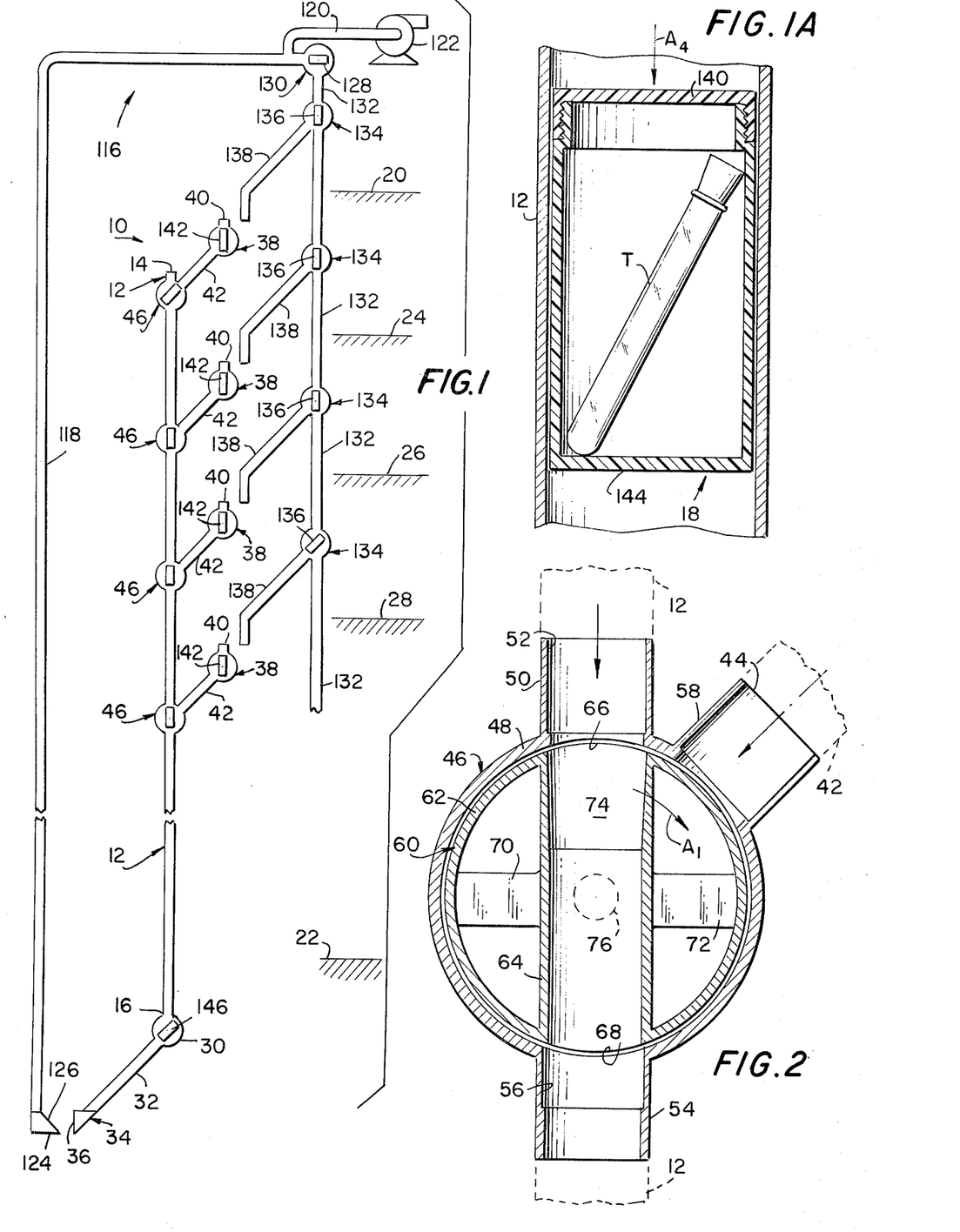
FIG. 1 is a schematic elevational view of a representative form of the present invention shown proximate a return system.
FIG. 1A is a fragmentary sectional elevational view of a conduit of the present invention including a container shown therein.
FIG. 2 is a sectional elevational view of a representative conduit exchange member.

Referring now specifically to the drawing and first to FIG. 1, there is shown an illustrative apparatus embodying objects and features of the present invention, generally designated by the reference numeral 10, which includes a conduit 12 which is shown in the illustrative preferred embodiment as extending substantially vertically from a first or upper end 14 to a second or lower end 16 located therebelow. In this illustrative form of the invention, the conduit 12 is shown as extending vertically, though, in practice, the conduit 12 could be at any angle so long as the upper end 14 were located at a position of higher potential energy than was the lower end 16, for a purpose to be described hereinafter.

The conduit 12 is shown as being generally cylindrical or circular in cross section though other shapes are possible. In addition, the conduit 12 could conceivably have convolutions therein or could be gently curved so long as a container 18 (see FIG. 1A) to be described in greater detail hereinafter, is configured relative thereto to be able to be transported within the conduit 12 from the upper end 14 to the lower end 16.

The conduit 12, in extending between the upper end 14 located at a first location 20 and the lower end 16 located at a second location 22, in the preferred embodiment illustrated, traverses several intermediate locations 24, 26, 28. The first location 20, the second location 22 and the three intermediate locations 24, 26, 28 are generally schematically represented in FIG. 1.

The locations 20, 24, 26, 28 may be various upper floors in a building wherein the subject invention is to be utilized. The second or lowermost location 22 may either be one of the above-ground floors of a building or, if the point of utilization of the materials to be transported within the container 18 is in a subterranian location, the location 22 can be below ground level such as a basement, sub-basement or the like.

As may be seen by reference to FIG. 1, the upper end 14 of the conduit 12 is closed by any conventional method such as by being capped with a pipe if the conduit 12, is in fact, a pipe. As will be discussed in greater detail hereinafter the closure of the upper end 14 of the conduit 12 need not render the upper end of the conduit completely impervious to passage of air therethrough so long as the upper end is substantially sealed against the passage of air.

As may be seen by reference to FIG. 1 the lower end 16 of the conduit 12 is in communication with a conduit exit member 30 to be described in greater detail hereinafter. The conduit exit member 30 is, in turn, in communication through exit conduit 32 with exit conduit closure member 34, access to the interior of which is had through a cover 36 which is normally urged to a closed position by a spring or the like in a well-known manner.

As will be described in greater detail hereinafter, in virtue of the construction and arrangement of the various members in communication with the conduit 12 and in virtue of the construction and arrangement of the conduit itself, in the preferred embodiment illustrated and described, the conduit 12 is substantially always closed with respect to the atmosphere at both its upper and lower ends 14, 16.

Entrance to and exit from the conduit 12 of containers 18 is accomplished without establishing unrestricted communication between the interior of the conduit 12 and the atmosphere. It should be noted, however, that complete isolation of the interior of the conduit 12 from the atmosphere is not required for functioning of the present invention as will be apparent from the discussions and the description which follow. Rather, all that is required is that there be a substantial prevention of unrestricted communication between the interior of the conduit 12 and the atmosphere surrounding the conduit.

Entrance to the conduit 12 is through a primary conduit entrance member 38 shown schematically in FIG. 1 and to be described in greater detail hereinafter. As may be seen by reference to FIG. 1, the primary conduit entrance member 38 is the means of initial entry to the conduit 12 at each of the locations 20, 24, 26, 28 from which entrance to the conduit 12 is to be had.

Entrance to the primary conduit member 38 from the atmosphere is through entrance port 40 which communicates with the interior of the entrance member 38 in a manner and for a purpose to be described. The interior of the primary entrance member 38 is also in communication, at a circumferentially displaced lower position, with a first end of an entrance conduit 42 which communicates at its second, lower end with an entrance port 44 of a secondary conduit entrance member 46 which is inserted within conduit 12 in a manner to be described.

As noted hereinbefore, the container 18 is configured to be transported within the conduit 12. The container 18 is also configured to be transported within the conduits 42. Once the container 18 enters the conduit 42 through the first or primary conduit entrance member 38 (in a manner to be described hereinafter) and the primary conduit entrance member 38 is operated in a manner to be described, the container 18 enters the first or upper end of the entrance conduit 42. The first end of the entrance conduit 42 is elevated with respect to the second end thereof. Consequently, the container 18 traverses the conduit 42 from the first to the second end under the influence of gravity and reaches the second end of the conduit 42 wherein it enters the entrance port 44 of the secondary conduit entrance member 46.

Figures 3, 4, 5A, 5B:
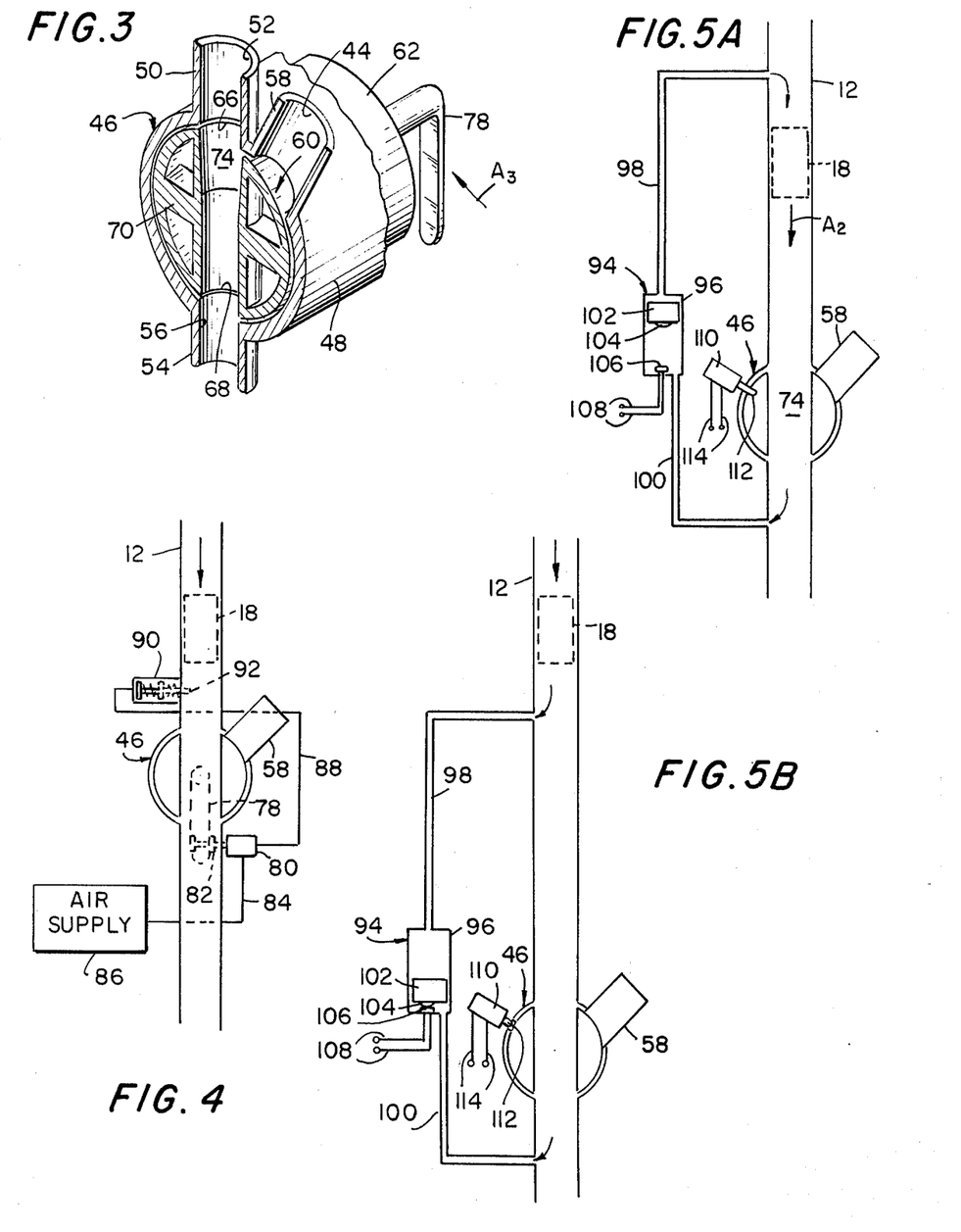

As may be seen by reference to FIGS. 2 and 3, the secondary conduit entrance member 46 includes a generally cylindrical stationary outer member 48 and includes an upper, generally cylindrical, radially upwardly extending conduit 50 which, through the interior 52 thereof, communicates with the interior of the stationary outer member 48.

A generally cylindrical, radially downwardly extending lower conduit 54 is affixed to the lower part of the stationary outer member 48. The lower conduit 54 communicates, through the interior 56 thereof, with the interior of the stationary outer member 48.

As may be seen by reference to FIGS. 2 and 3, the conduits 50, 54 are constructed and arranged so that their respective interiors 52, 56 are co-axially aligned with one another though the conduits 50, 54 are affixed on opposite circumferential locations to the secondary conduit entrance member 46 for a purpose to be described hereinafter.

The interior of the conduit 12 is in communication with the interior 52 of the upper conduit 50 and is also in communication with the interior 56 of the lower conduit 54. For ease of description, the conduit 12, though several secondary conduit entrance members 46 are inserted therein at various specified locations, is discussed as if it were continuous from the first location 20, through the various secondary locations 24, 26, 28 to the second location 22 despite the interruption of the longitudinal extent thereof by the secondary entrance conduits 46 located at the first and intermediate locations 20, 24, 26, 28.

It is therefore to be understood that when reference is had to the conduit 12 extending from the first location 20 to the second location 22 such reference contemplates the interconnection with the secondary conduit entrance members 46 just described.

The entrance port 44 appears within a radially outwardly extending cylindrical conduit 58. The port 44 also communicates with the interior of the secondary conduit entrance member 46, as may be seen most clearly by reference to FIGS. 2 and 3.

Located within stationary outer member 48 is a rotatable generally cylindrical inner member 60 rotatably mounted to be co-axial with the stationary outer member 48 (see FIGS. 2 and 3). The inner member 60 includes a generally cylindrical outer shell 62 which includes a cylindrical inner transfer cylinder 64 at one end thereof. The transfer cylinder 64 communicates through the exterior of the shell 62, through upper and lower, entrance and exit ports 66, 68 which open through the upper and lower surfaces of the shell 62.

The cylindrical inner transfer cylinder 64 is located within the shell 62 in a manner to extend radially within the shell 62, is located so as to intersect and be perpendicular to the axis thereof, and is rigidly positioned within the shell 62 by support ribs 70, 72.

As may be seen by reference to FIGS. 2 and 3, the transfer cylinder 64 and the shell 62 are located to permit alignment of the entrance and exit ports 66, 68 and the interior 74 of the transfer cylinder 64 with the interiors 52, 56 of the conduits 50, 54 and consequent alignment with the interior of the conduit 12.

The rotatable inner member 60 rotates within the stationary outer member 48 about appropriately journalled axially extending axle members, one of which is shown in phantom in FIG. 2 and indicated by reference numeral 76. The inner member 60 is capable of rotating in the direction of the directional arrow $A_1$ shown in FIG. 2 to bring the entrance port 66 into alignment with the interior of the conduit 58 for a purpose to be described hereinafter.

As may be seen by reference to FIG. 3, an operating handle 78 is fixed to the center of the generally circular end face of inner member 60 for use in rotating the inner member 60 and the transfer cylinder 64 from the "normal" position shown in FIGS. 2 and 3 and to the alternate position to be described wherein the entrance port 66 of the transfer cylinder 64 aligns with the interior 74 of the conduit 58.

The secondary entrance member 46 may include appropriate stops and/or detent means to ensure proper alignment of the interior 74 of the transfer cylinder 64 with the conduit 12 when the inner member 60 is in the "normal" position shown in FIGS. 2 and 3. In addition, stops or detent means may be provided to ensure proper alignment of the entrance port 66 with the interior of the conduit 58 when the inner member 60 is rotated into a position which is clockwise from the "normal" position shown in FIGS. 2 and 3.

FIG. 4 illustrates a normally open pneumatic control actuating switch 80 which includes an actuator 82. As may be seen by reference to FIG. 4, the switch 80 and its actuator 82 are positioned relative to the secondary conduit entrance member 46 and the operating handle 78 thereof so that the operating handle permits the actuator 82 to move from its retracted position shown to the right in FIG. 4 to an actuated position to the left when the rotatable inner member 60 is moved from the normal position shown in FIGS. 2, 3 and 4. The "actuated" or extended position of the actuator 82 (shown to the left in FIG. 4) permits the normally open actuating switch 80 to open while the position shown to the right closes the switch.

The inlet of the actuating switch 80 is in communication, through air line 84, with a source of pressured air from an air supply 86. The outlet of the switch 80 is connected through an air line 88 to the inlet of a switch which operates a solenoid 90 which includes a conduit blocking member 92 in the form of a solenoid plunger which is constructed and arranged to protrude into the conduit 12 (or an appropriate portion of the conduit 50 of the secondary entrance member 46). The solenoid 90 can be replaced by an air-operated piston.

As may be seen by reference to FIG. 4, the conduit blocking member 92 is capable, upon actuation, of extending into the conduit 12 (or the segment of the conduit 50 with which it is in communication) sufficiently to prevent the movement through the conduit 12 (or through the conduit 50) of a container 18.

The conduit blocking member 92 extends to its blocking position upon the inner member 60 being rotated clockwise as seen in FIGS. 2, 3 and 4 and the handle 78 moving out of contact with the actuator 82. The normally open actuating switch 80 is thereby permitted to open. Upon the switch 80 opening, air is provided from the air supply 86 through the air line 84, through the open switch 80, through the air line 88 to the solenoid 90. Upon receipt of air to the switch (not shown), the solenoid 90 operates to extend the solenoid plunger 92 into the "blocking" position within the conduit 12 or conduit 50 for a purpose to be described more fully hereinafter.

Naturally, the pneumatic system described in connection with FIG. 4 may be replaced by an appropriate conduit instrusion apparatus which is both signaled and operated entirely electrically, utilizing well-known components. The only requirement of the conduit intrusion apparatus is that it operate to extend a blocking device into the conduit 12 upon rotation of the inner member 60 from its normal position as shown in FIGS. 2, 3 and 4; and, that the intrusion apparatus be operable to retract the blocking member (such as the solenoid plunger 92) upon the inner member 60 returning to its normal position.

In the conduit intrusion apparatus shown, upon the inner member 60 returning to the normal position shown in FIGS. 2, 3 and 4, the actuator 82 is contacted by the operating handle 78 and is forced to close the normally open switch 80 thereby cutting off communication between the air supply 86 and the switch for the solenoid 90. The solenoid 90 is constructed and arranged so that once its switch no longer receives a supply of air from the air supply 86, the solenoid plunger 92 returns to a retracted position within the solenoid 90. The conduit 12 is thereby unblocked thus completely freeing the interior of the conduit 12 for the passage therethrough of an appropriate container 18 or an article with a similarly-sized and configured external configuration.

FIGS. 5A and 5B illustrate a proximity detection apparatus generally indicated by the reference numeral 94. In the illustrative proximity detection apparatus 94 which is shown, the top of a pneumatic detector cylinder 96 is in communication with the interior of the conduit 12 upstream of a secondary conduit entrance member 46 through a tube 98.

The upper end of the tube 98 communicates with the interior of the conduit 12 and the lower end of the tube 98 communicates with the top of the detector cylinder 96.

The bottom of the detector cylinder 96 is in communication, through a tube 100, with the interior of the conduit 12 downstream of the same secondary conduit entrance member 46.

A proximity detection piston 102 (which must be very light in weight as will appear) is located within the cylinder 96 and includes an actuator 104 on its lower surface. A switch 106 is located within the cylinder 96 and is constructed and arranged to be actuated and closed by the actuator 104 when the piston 102 is in its lower position within the cylinder 96 as shown in FIG. 5B.

Electrical conductors 108 are provided and are connected to the switch 106. The conductors 108 are connected together or shorted upon the piston 102 being in the lower position shown in FIG. 5B with the actuator 104 contacting the switch 106.

A solenoid 110 is arranged relative to the secondary conduit entrance member 46 to permit extension into and through an appropriate opening within the walls of the secondary conduit entrance member 46 of a solenoid plunger 112 thereof. The solenoid 110 may be a pneumatically actuated solenoid such as the solenoid 90 described hereinbefore with reference to FIG. 4 or it may be an electrically actuated solenoid such as is shown in FIGS. 5A and 5B which is supplied with an appropriate actuating signal through conductors 114.

In FIG. 5A, a container 18 is shown a pre-determined distance above the secondary conduit entrance member 46. The pre-determined distance is determined by the location of the point of communication of the upper end of the tube 98 with the interior of the conduit 12. In this position, the fluid within the conduit 12 (which, in the preferred embodiment, is air) is drawn out of the tube 98 by well-known principles of physics by the passage of the container 18 in the direction of the directional arrow $A_2$ through the conduit 12.

In addition, the fluid within the conduit 12 is forced through the interior 74 of the secondary conduit inlet member 46 and into the lower end of the tube 100. The apparatus thereby provides a flow of fluid in an upward direction through the detector cylinder 96. The upward flow of fluid through the detector cylinder 96 causes the piston 102 to rise to the position shown in FIG. 5A and causes the actuator 104 to rise out of contact with the switch 106. The switch 106 thereby opens and there is an open circuit between the conductors 108.

In accordance with well-known principles of physics the opening of a circuit between conductors 108 operates another switch (not shown) to provide electricity to the solenoid 110 through the conductors 114. Solenoid plunger 112 is thereby caused to extend and be inserted through the openings noted hereinbefore into the walls of the secondary conduit entrance member 46 as shown in FIG. 5A.

As discussed in greater detail hereinafter, this insertion of the solenoid plunger 112 through the openings in the secondary conduit entrance member 46 prevents any rotation of the rotatable inner member 62 for a purpose to be described.

Upon completion of the passage of a container 18 through the interior 74 of the secondary conduit inlet member 46, and upon passage of the container 18 below the communication of the lower end of the tube 100 with the interior of the conduit 12, the fluid within the detection cylinder 96 is caused to move downwardly with respect thereto (according to well-known laws of physics) thereby causing the piston 102 to move to the lower position shown in FIG. 5B. With the piston 102 in the lower position, the actuator 104 contacts the switch 106, again shorting the conductors 108. This shorting of the conductors 108, through well-known means, interrupts the supply of electrical energy to the conductors 114 thereby de-energizing the solenoid 110 and causing the solenoid plunger 112 to retract, thereby again permitting free operation of the secondary conduit entrance member 46.

As will be noted by reference to FIG. 5B, when a container 18 is located within the conduit 12 above the point of communication thereof with the upper end of the tube 98, the fluid within the conduit 12 is forced into the tube 98 at a given pressure. This given pressure is a greater pressure than the pressure at which the fluid is forced into the lower end of the tube 100 spaced therefrom. This difference in pressure is due, inter alia, to the compressible nature of the fluid within the tube 12.

The result is that the net force on the piston 102 in the configuration of FIG. 5B, is in a downward direction and the solenoid 110 is not energized. The condition illustrated in FIG. 5B can be said to delineate the condition where the container 18 is approaching but is not proximate the secondary conduit entrance member 46.

Naturally, the proximity detection apparatus 94 just described can have the various components thereof substituted for by appropriately configured and positioned detectors of other sorts including magnetic or light detection apparatus including photocells or the like.

As noted hereinbefore, the conduit 12 which extends between the first location 20 and the second location 22 is shown in the presently preferred embodiment as extending between the first and second locations in a substantially vertical direction. However, it is not necessary for the conduit 12 to be substantially vertical as shown in the illustrated preferred embodiment as long as the first location wherein a container 18 is inserted within the conduit 12 is located at a position of higher potential energy than is the second location.

In addition, as will be discussed in greater detail hereinafter, no external motive force other than gravity is required for the transportation of a container between the first and second locations within the conduit 12.

Consequently, once a container has been introduced into the conduit 12 from the first, or one of the intermediate locations, and has travelled to the second location, it is usual that the container 18 will be re-used to transport additional contents from the first or an intermediate location, to the second location. Of necessity, the containers at the second location must be transported to the first or intermediate locations by means other than the present invention.

Accordingly, FIG. 1 shows a system for effectuating return of containers 18 from the second location 22 to either the first location 20 or one of the intermediate locations 24, 26, or 28. The return system illustrated in FIG. 1, generally indicated by the reference numeral 116, utilizes a return conduit 118 which is connected in communication, through exhaust conduit 120, with the inlet of an exhaust fan 122. The exhaust fan 122 creates negative pressure, relative to atmospheric pressure, within the return conduit 118 by virtue of interconnection with the conduit 118 through the conduit 120 at the top or upper end thereof at the first location 20.

It will be recognized that results similar to those to be described, i.e., return of containers, can be effectuated by increasing the pressure within the conduit 118 above atmospheric by the use of a blower fan, the outlet of which would be connected to the conduit 118 at the lower end thereof, at the second location 22.

Entrance to the lower, second location end, of the return conduit 118 is through a closure member 124 through a spring loaded cover 126 which is normally urged closed in a manner similar to cover 36 for closure member 34.

Naturally, the interior of the conduit 118 is configured to accept containers therein similar to the container 18 shown in FIG. 1A for transport between the second location 22 and the first location 20. In addition, the right-angle bend which appears within the conduit 118 near the horizontal segment thereof is of a radius and a configuration to permit movement about said bend of the container 18 under the influence of the reduced pressure within the conduit 118 caused by the previously described interconnection to the inlet of the exhaust fan 122.

Upon the cover 126 being opened and a container 18 being inserted within the conduit 118, and the cover 126 being closed, the reduced pressure within the container 118, according to well-known principles and utilizing well-known apparatus, rises from the second location 22 to the first location 20, rounds the bend within the conduit 118 and advances toward the exhaust conduit 120. Owing to the sharp bend which exists between the point of communication of the exhaust entrance conduit 120 with the interior of the horizontal segment of the conduit 118, and in view of the momentum of the container 18 being propelled along the horizontal segment of the conduit 118, the container 18 does not enter the exhaust conduit 120. Instead, the container 18 enters an appropriately sized return cylindrical transfer cylinder 128 rotatably mounted within a return receiving member 130 in communication with the rightmost end of the conduit 118.

Upon a returned container being located within return receiving member 130 (perhaps signaled by an appropriate signaling device) appropriate means are actuated to rotate the left, open end of the return transfer cylinder 128 within the return receiving member 130 to align the open end of the transfer cylinder 128 and the container 18 therein with the upper end of a return delivery conduit 132. Return delivery conduit 132, as may be seen by reference to FIG. 1, extends between the first location 20 and each of the intermediate locations 24, 26, 28.

Return delivery members 134 are located at each of the locations. Each of the return delivery members 134 include therein a rotatably mounted return transfer cylinder 136, open at both ends, and configured to receive a container 18 therein. The cylinder 136 permits the container 18 to pass therethrough unless a sequence of events, to be described, occurs.

Each of the cylinders 136 may include an operating handle, similar to the operating handle 78 affixed to the cylinder 62, fixed thereto for use in movement of the cylinders 136 between the normal position of the cylinders shown proximate locations 20, 24, 26 and the "delivery" position shown for the cylinder 136 proximate the location 28. In addition, cylinder blocking means such as shown and described hereinbefore with reference to FIG. 4 may be located proximate each of the return delivery members 134 to permit proper functioning of the cylinders 136 and prevent malfunctioning thereof due to the unwanted intrusion of a container 18.

Upon a container 18 being delivered to a particular location, for example the intermediate location 28, all of the cylinders 136 upstream of that location must have been in their normal position to permit the cylinder to pass from the return receiving member 130 through the conduit 132 to the return delivery member 134 proximate location 28. Apparatus is provided downstream of the cylinder 136 within the preselected return delivery member 134 to block passage of a container 18 through the pre-selected cylinder. Such blocking of passage may be by means of a blocking member operated by a solenoid which is either pneumatically or electrically actuated or may be by the use of a manual conduit blocking device which is operable by hand.

Once a container 18 is located within the cylinder 136 which has been pre-selected (in the embodiment of FIG. 1, proximate location 28), the cylinder 136 is rotated within the return delivery member 134 until the downstream, open end thereof is aligned with the upstream end of conduit 138. The downstream end of the cylinder 136 permits the container 18 to enter the conduit 138 and exit proximate the primary conduit entrance member 38 located at the pre-selected location (here, location 28).

The container 18, which is shown in FIG. 1A as including a screw thread at the top thereof and a cap 140 threadably attached thereto, is opened, for example by removing the threaded cap 140.

Among the item or items which may be transported within the container 18 are a test tube T which may contain a blood sample if the subject invention is being used in a hospital for delivery from various locations to a laboratory. Alternately, the container 18 may be replaced by an object which has a similar external configuration.

Once the items to be transported are in place within the container 18 (and it is notable that the present invention functions to transport the container 18 at a sufficiently reduced speed so that special cushioning for even fragile items within the container is not required), the container and contents are placed, through the entrance port 40, in a transfer cylinder 142 within the primary conduit entrance member 38.

The generally cylindrical, open-ended transfer cylinder 142 within the primary conduit entrance member 38 is illustrated in FIG. 1 as rotated to its normal position proximate locations 20, 24, 26, 28. The cylinder 142 is rotatably housed within the primary conduit entrance member 38 in a manner similar to the cylinder 64 of the secondary conduit entrance member 46 illustrated and described with respect to FIGS. 2 and 3 hereinbefore.

It is notable that the cylinder 142 is open at its upstream and downstream ends though, by virtue of the placement of the entrance port 40 and the interconnection of the upper or upstream end of the entrance conduit 42 relative to the cylinder 142 in the normal position of the cylinder 142 there is no direct communication between the entrance port 40 and the entrance conduit 42. Naturally, if it is desired, the location of the entrance port 40 can be placed so that it would be rotated approximately 45° counterclockwise from the position shown in FIG. 1 so that at no time during the movement of the cylinder 142 will there be even partial communication between the port 40 and the interior of the entrance conduit 42.

The present invention is designed so that the fit between the rotatable mounting member for the cylinder 142 (which is similar to the rotatable inner member 60 shown in FIGS. 2 and 3) and the stationary exterior of the primary conduit entrance member 38 may permit entrance of a certain, limited amount of air from the atmosphere into the conduit 42. However, the limited amount of air which can enter does not prevent the proper functioning of the present invention.

For prevention of the entrance of undesired air into the system, a switch, solenoid plunger apparatus (not shown) may be utilized relative to transfer cylinders 142 within primary conduit entrance member 38 and transfer cylinder 64 within secondary conduit entrance member 46. The switches and solenoid plungers can be arranged to prevent direct communication between the interior of the conduit 12 and the atmosphere, as follows. A switch proximate the operating handle 78 of the secondary conduit entrance member 46 can be arranged to be actuated to cause a solenoid plunger to be inserted within appropriate apparatus mounting the transfer cylinder 142 to prevent movement of the transfer cylinder 142 from a position wherein its open, lower end was aligned with the upper end of the entrance conduit 42 upon the transfer cylinder 64 being moved from the position wherein the interior 74 thereof was aligned with the conduit 12.

In a similar manner, a switch proximate an operating handle attached to a mounting member for transfer cylinder 142 may be constructed and arranged to actuate a solenoid to insert a plunger within the secondary conduit entrance member 46 to prevent rotation of the shell 62 from the position shown in FIGS. 2 and 3 (wherein upper entrance port 66 and lower entrance port 68 are aligned with the interior of the conduit 12) until such time as the transfer cylinder 142 does not have its interior in communication with the atmosphere through the entrance port 40.

Alternately, the primary and secondary conduit entrance members 38, 46 may be located sufficiently close to one another so that an operator of the apparatus of the present invention would not operate the respective transfer cylinders 64, 142 to establish communication between the atmosphere and the interior of the conduit 12. In such a situation, the switch, solenoid plunger arrangement just described can be eliminated.

Upon the cylinder 142 being rotated clockwise as seen in FIG. 1 (perhaps by the use of an operating handle similar to the operating handle 78 affixed to the shell 62), the container 18 and contents located therein moves down the downwardly inclined entrance conduit 42 and arrives at a corresponding secondary conduit entrance member 46.

When the transfer cylinder 64 is in the normal position shown in FIGS. 2 and 3 within the secondary conduit entrance member 46, an arrangement similar to that shown in FIG. 4 (or the equivalent) can be operated to insert a conduit blocking member into the conduit 58 through an appropriate opening to prevent full entrance of a container 18 into the secondary conduit entrance member 46 to bear against the rotatable shell 62 and possibly interfere with the smooth operation thereof.

Alternately, no such mechanism need be provided as it is unlikely that the downstream end 144 of the container 18 (see FIG. 1A), which is generally smooth, would interfere with the operation of the inner shell 62.

At the appropriate time (i.e., when a container 18 approaches proximate the entrance port 44), the rotatable shell 62 is rotated in a clockwise direction as viewed in FIGS. 1, 2 and 3, by actuation of the operating handle 78 in the direction indicated by the directional arrow $A_3$ in FIG. 3 and the entrance port 66 of the cylinder 64 is rotated into alignment with the interior of the conduit 58. The container 18 and contents moves from the location within the conduit 58 into the interior 74 of the cylinder 64.

It should be noted that the location of the conduit 58 relative to the conduit 50 of the secondary conduit entrance member 46 can be located with its center line rotated approximately an additional 20° clockwise from the location shown in FIGS. 1, 2 and 3. Such a location would prevent even momentary communication between the interior of the conduit 12 and the interior of the conduit 58 through the interior 74 of the cylinder 64. Such lack of communication would also prevent any communication, through the interior 74 of the cylinder 64, of the conduit 12 with the atmosphere through the entrance port 40.

Such a rotated relocation of the conduit 58 may also be used to eliminate the need for a primary conduit entrance member with the result that conduit entrance means of the subject invention, rather than comprising the combination of the primary conduit entrance member 38 and the secondary conduit entrance member 46 and the associated interconnecting members, would only be comprised of what is here termed the secondary conduit entrance member 46.

With the container 18 within the interior 74 of the cylinder 64, the rotatable member 60 is moved to rotate the member 60 counterclockwise and the interior 74 of the cylinder 64 is once again aligned with the interior of the conduit 12. The container 18 is thereafter free to fall, under the influence of gravity, in a downward direction as indicated by the directional arrow $A_4$ in FIG. 1A within the conduit 12.

As may be seen by reference to FIG. 1A, the external diameter of the container 18 substantially equals the interior diameter of the conduit 12. As noted hereinbefore, in the illustrative embodiment, the inner configuration of the conduit 12 and the outer configuration of the container 18 are both cylindrical. Consequently, there is an annulus in the form of a cylindrical solid which exists between the exterior of the container 18 and the contiguous interior of the conduit 12. In view of the fact that the amount and flow of fluid within the conduit 12 is contained and controlled as described, the "fit" between the exterior of the container and the interior of the cylinder 12 need not be especially close.

Experimental results have indicated that, with a conduit 12 closed at the bottom, a container approximating 1.50 inches in diameter which is configured as shown, having a longitudinal extent of approximately 4 inches, a difference between the external diameter of the container 18 and the interior diameter of the conduit 12 of 0.025 inches (which is not especially difficult to obtain with commercially available tolerances) provides descent rates of approximately 4 feet per second with containers which weigh on the order of 85 grams. Naturally, increasing the diameter of the container 18 to decrease the "gap" forming the annulus between the exterior of the container and the interior of the conduit 12 further reduces the rate of descent as does increasing the length of the annulus which exists between the exterior of the container and the contiguous interior of the conduit 12.

As will be discussed hereinafter, the velocity of a descending container 18 will increase, other parameters remaining constant, with increased container weight and will decrease with decreased container weight.

In accordance with experiments conducted on various container and conduit configurations, it is anticipated that a conduit having a cross sectional area of one square foot would be capable, with appropriately configured containers within appropriate conduits, of delivering a pay load of 100 pounds at a velocity of less than three feet per second.

It is notable that the conduit 12 which has been described in the preferred embodiment is closed to the atmosphere at its upper end 14. In addition, the lower end 16 of the conduit 12 is in communication with the interior of a conduit exit member 30 which is also closed to the atmosphere through the exit conduit closure member 34 and the cover 36.

As may be noted by reference to FIG. 1, a transfer cylinder 146 is rotatably mounted within the conduit exit member 30 in a manner similar to the manner of mounting of the cylinder 64 within the secondary conduit entrance member 46. The conduits 12, 32, the conduit exit member 30, and the cylinder 146 are all constructed and arranged so that the lower end of the conduit 12 is, for all intents and purposes, sealed against communication with the atmosphere.

It has been found that while the conduit 12 and the remainder of the representative and preferred embodiment described herein function best to retard the flow of air (or other appropriate fluid within the conduit 12) about the descending container 18, the invention functions when either solely the upper end 14 of the conduit 12 or solely its lower end 16 is closed against communication with the exterior of the conduit 12. As noted hereinbefore, a certain amount of leakage through the various entrance and exit members and through the various closure means can be tolerated while still permitting functioning of the apparatus to control the descent of the container 18 through the conduit 12.

Naturally, once the container 18 has reached the lower end 16 of the conduit 12, located at the second location 22, it either enters the cylinder 146 through its upper open end or may be prevented from so doing by a conduit intrusion device which has protruded into the lower end of the conduit 12 by a mechanism similar to that illustrated and described with respect to FIG. 4. At the appropriate time the cylinder 146 is rotated either to receive the waiting container 18 through its upper end or to discharge the received container from its lower open end along the exit conduit 32 to be removed from the exit conduit closure member 34 when the cover 36 is opened.

While the illustrative embodiment of the present invention which has been shown and described illustrates a fluid passage restriction between the exterior of the container 18 adjacent the interior of the conduit 12 which extends for the entire longitudinal extent of the container, conceivably, if the items to be transported within the container are sufficiently light, the container 18 can be redesigned. Specifically, so long as a part of the longitudinal extent of the container is of an external diameter sufficient to provide restriction for fluid which flows thereabout upon the container moving from the first to the second location within the conduit, the remainder of the container can be of significantly smaller diameter.

It has been determined by experimentation that shortly after the container 18 begins its descent within the conduit 12, the container attains a constant downward velocity and maintains this constant downward velocity for substantially the entire traverse from the first location 20 to the second location 22 within the conduit 12. The descending container 18 naturally produces a difference in pressure within the conduit 12 based upon many factors. As the container 18 moves downwardly under the influence of gravity, the fluid within a conduit which is closed both top and bottom (as its upstream and downstream ends) becomes compressed below the descending container (wherein the fluid increases in pressure) and becomes rarified or expands (and thereby reduces in pressure) above the container. The fluid within the conduit constantly flows about the container 18 and the upward movement of the fluid relative to the container, both as it impinges upon the lower or downstream surface 144 of the container 18, and as it is restricted in passage between the exterior of the longitudinal circumference of the container contiguous the interior of the conduit 12, exerts a retarding force on the descending container in the upward direction. This retarding force serves to counteract, in part, the downward gravitational force, and slows the descent of the container 18 within the conduit 12. This movement of the air or other fluid about the descending container tends to try to equalize the differential in pressure which exists within the conduit 12 on either side of the descending container 18.

If the conduit 12 is closed only at the top or upper end 14, as the container descends within the conduit under the influence of the force of gravity, it creates an area of reduced pressure within the part of the conduit 12 located thereabove which tends to draw additional air or other fluid past the descending container into the upper segment of the conduit.

The restriction caused by the proximity of the exterior configuration of the container to the contiguous interior portion of the conduit 12, slows down the entrance of the air or other fluid from the open lower segment of the conduit 12 into the upper segment past the descending container thereby slowing down the descent of the container 18. This retardation of the descent is not of the same order as the slowing of the descent of the container accomplished when the conduit 12 is closed at both its upper and lower ends 14, 16 but is comparable therewith.

Experiments have been conducted to determine the specific effect, in limited experimental situations, of a variation of various of the design parameters of the subject invention. The results of the experiment are set out hereinafter. It is to be emphasized that the materials, lengths of conduit, weights and other tabulated experimental results which are included are meant to be merely illustrative of of the subject invention and are in no way intended to be restrictive of the scope of coverage to which the subject invention is entitled.

Simulated specimen containers were fabricated from commercially available plastic and metal tubing by machining the tubing to various diameters and lengths, and sealing one end, and by adding varying amounts of material to vary the weight thereof.

The nominal inside diameter of the conduit ranged between 1.5 and 3.5 inches and the length of the conduit ranged from 4 to 30 feet. The 30 foot long conduit was fabricated from 3 ten foot lengths joined together with threaded couplings.

Commercially available photocells and lightbulbs were mounted at fixed intervals along the length of the conduit for monitoring the passage of the container, which was recorded on a time-based recorder (all of conventional design) in a conventional manner using well-known apparatus and proceedures.

In general, Table 1 illustrates that when both ends of the conduit are open, the descent of the container approximates that of free fall, friction being negligible. When either or both ends of the container are closed, the descent velocity is significantly slower than free fall. Slowest descent occurs when both ends of the conduit are closed but is approximately the same as for the condition when the top end of the conduit is closed.

Increasing the diameter of the container or increasing its length contiguous the interior of the container or decreasing the weight of the container decreases the average descent velocity as illustrated in Tables 2 and 3. Increasing the diameter of the conduit as shown in Table 3 permits delivery of proportionately heavier pay loads at lower average descent velocities.

The data collected in Table 4 demonstrates that acrylic containers descend at constant velocity inside a two inch diameter brass tube. As noted in Tables 2 and 3, the descent of a container decreases with increasing container diameter relative to the interior diameter of the conduit. Differences between the average and terminal velocities are not considered to be experimentally significant.

Table 5 illustrates data which were obtained for polyvinylchloride containers which were descending through a thirty foot high four inch aluminum pipe with a 3.54 inch internal diameter. In addition, the data collected in Table 5 shows that the container descends at constant velocity which decreases with increasing container diameter. Increasing the weight or decreasing the length of the container contiguous the interior wall of the conduit causes a less than proportionate increase in the descent velocity.

TABLE 1

Conduit: 4 foot long Acrylic tube - 2" outside diameter, 1½" inside diameter (nominal)
Containers: Acrylic containers - 50 grams, 4" long, 1½" outside diameter

| CONDITIONS | AVERAGE VELOCITY (ft/sec) |
|---|---|
| Bottom and Top Open | 10.2 |
| Bottom Closed | 2.0 |
| Top Closed | 1.6 |
| Bottom and Top Closed | 1.5 |

TABLE 2

Conduit: 8 foot long Acrylic tube - 2" outside diameter, 1½" inside diameter (nominal)
Containers: Acrylic cylinders - 1½" nominal outside diameter

| CONDITIONS | WEIGHT (gm) | LENGTH (in) | AVERAGE VELOCITY (ft/sec) |
|---|---|---|---|
| Bottom and Top Open | 50.0 | 4.0 | 14.0 |
| Closed Bottom | 97.3 | 4.0 | 3.3 |
| Closed Top-Open Bottom | 97.3 | 4.0 | 2.2 |
| Closed Top and Bottom | 97.3 | 4.0 | 2.0 |
| Closed Bottom | 50.0 | 4.0 | 2.1 |
| Closed Bottom | 100.0 | 8.0 | 2.2 |

Containers: Brass cylinders

| CONDITIONS | WEIGHT (gm) | DIAMETER (in) | LENGTH (in) | AVERAGE VELOCITY (ft/sec) |
|---|---|---|---|---|
| Closed Bottom | 86.3 | 1.480 | 4.0 | 4.2 |
| Closed Bottom | 86.3 | 1.485 | 4.0 | 4.1 |
| Closed Bottom | 86.3 | 1.490 | 4.0 | 3.0 |
| Closed Bottom | 86.3 | 1.495 | 4.0 | 2.6 |
| Closed Bottom | 146.6 | 1.480 | 8.0 | 5.4 |
| Closed Bottom | 146.6 | 1.490 | 8.0 | 3.8 |

TABLE 3

Conduit: Aluminum pipe - 7 feet long, 3.590" inside diameter
Containers: Polyethylene cylinders, 6" long

| CONDITIONS | WEIGHT (gm) | DIAMETER (in) | AVERAGE VELOCITY (ft/sec) |
|---|---|---|---|
| Top Closed | 210 | 3.540 | 0.35 |
| Top Closed | 210 | 3.554 | 0.24 |
| Top Closed | 210 | 3.555 | 0.23 |
| Top Closed | 600 | 3.540 | 0.98 |
| Top Closed | 600 | 3.554 | 0.64 |
| Top Closed | 600 | 3.555 | 0.56 |
| Top Closed | 1000 | 3.540 | 1.6 |
| Top Closed | 1000 | 3.554 | 0.94 |
| Top Closed | 1000 | 3.555 | 0.85 |
| Bottom Closed | 500 | 3.540 | 0.69 |
| Top Closed | 500 | 3.540 | 0.64 |
| Top and Bottom Closed | 500 | 3.540 | 0.57 |
| Bottom and Top Open | 110 | 3.555 | 7.8 |

TABLE 4

Conduit: Brass tube - 8 ft. long - 2"outside diameter × .062 wall thickness
Containers: Acrylic cylinders - 95.9 grams, 4"long

| CONDITIONS | DIAMETER (in) | AVERAGE VELOCITY (ft/sec) | TERMINAL VELOCITY (ft/sec) |
|---|---|---|---|
| Bottom Closed | 1.950 | 1.9 | 1.82 |

TABLE 4-continued

Conduit: Brass tube - 8 ft. long - 2"outside diameter × .062 wall thickness
Containers: Acrylic cylinders - 95.9 grams, 4"long

| CONDITIONS | DIAMETER | AVERAGE VELOCITY | TERMINAL VELOCITY |
|---|---|---|---|
| Bottom Closed | 1.960 | 1.4 | 1.29 |
| Bottom Closed | 1.975 | .62 | .50 |
| Bottom Closed | 1.985 | .54 | .36 |
| Open Bottom and Top | 1.985 | 11.2 | |

TABLE 5

| WEIGHT | LENGTH | DIAMETER OF CONTAINER (inches) | | | | |
|---|---|---|---|---|---|---|
| (gms) | (inches) | 3.470 | 3.480 | 3.490 | 3.500 | 3.510 |
| | | VELOCITY (ft/sec) | | | | |
| 234 | 4" | 2.58 | 2.30 | 2.03 | 1.52 | 1.22 |
| 234 | 8" | 2.18 | 2.02 | 1.67 | 1.18 | 0.96 |
| 234 | 10" | 1.96 | 1.77 | 1.49 | 1.03 | 0.85 |
| 443 | 10" | 3.05 | 2.80 | 2.36 | 1.76 | 1.37 |
| 661 | 10" | 3.96 | 3.55 | 3.02 | 2.32 | 1.95 |
| 879 | 10" | 4.61 | 4.18 | 3.55 | 2.73 | 2.40 |

As will be readily apparent to those skilled in the art, the invention may be used in other specific forms without departing from its spirit or essential characteristics. For example, appropriate conduit intrusion apparatus can be added at any desired location along the conduit 12 to permit removal of a container at an intermediate location through a generally downwardly directed exit conduit if an appropriate conduit exchange member is placed in communication therewith. The present embodiment is, therefore, to be considered as illustrative and not restrictive, the scope of the invention being indicated by the claims rather than by the foregoing description, and all changes which come within the meaning and range of equivalence of the claims are therefore intended to be embraced therein.

What is claimed is:

1. Apparatus for use in transporting at least one container between a first location and a second location substantially only under the action of gravity, said first location being elevated relative to said second location, said apparatus including a conduit having at least a first end and a second end, said conduit including containment means being adapted to substantially completely prevent movement of fluid relative to the interior of said conduit through at least one of said conduit ends, said conduit extending between said first location and said second location and having an interior with a given configuration, fluid passage restriction means for controlling the descent of said container within said conduit from said first location to said second location by restricting the passage of fluid between said conduit interior and the external configuration of said container, exchange means in communication with said conduit proximate one of said locations and being constructed and arranged for permitting movement of a container between the interior and exterior of said conduit at said location so that the amount of fluid within said conduit at said location remains substantially unchanged through said exchange means.

2. The invention according to claim 1, said conduit first end being at said first location and said conduit second end being at said second location, said containment means including means for substantially completely closing at least one of said conduit ends against movement of fluid through said closed end.

3. The invention according to claim 2, said containment means including means for substantially completely closing the other end of said conduit against movement of fluid through said other end.

4. The invention according to claim 1, including a further exchange means in communication with said conduit proximate the other of said locations, said further exchange means being constructed and arranged for permitting movement of a container between the interior and exterior of said conduit at said other of said locations so that the amount of fluid within said conduit at said other of said locations remains substantially unchanged through said further exchange means.

5. The invention according to claim 1, including means for preventing operation of said exchange means upon a container being in said conduit proximate said exchange means.

6. The invention according to claim 1, said apparatus including conduit intrusion means being operable to protrude into said conduit and block passage of a container through said conduit, and means for operating said conduit intrusion means to block passage of a container through said conduit upon said exchange means being operated to move a container between the interior and exterior of said conduit.

7. The invention according to claim 1, said fluid passage restriction means comprising said external configuration of said container in combination with said interior configuration of said conduit whereby said passage of fluid therebetween is restricted thereby.

* * * * *